United States Patent [19]

Ruell

[11] 4,368,979
[45] Jan. 18, 1983

[54] AUTOMOBILE IDENTIFICATION SYSTEM

[75] Inventor: Hartwig Ruell, Mt. Laurel, N.J.

[73] Assignee: Siemens Corporation, Iselin, N.J.

[21] Appl. No.: 152,512

[22] Filed: May 22, 1980

[51] Int. Cl.³ .................. G06K 9/74; G09F 7/00; B60R 13/10
[52] U.S. Cl. .................. 356/71; 40/201; 250/271; 340/146.3 P
[58] Field of Search .......... 356/71, 71 T; 40/201, 40/202, 206, 210; 116/33; 250/330, 332, 271; 340/146.3 P

[56] References Cited

U.S. PATENT DOCUMENTS 3,807,859  4/1974  Sugaya et al. .............. 356/71
4,112,300  9/1978  Hall, Jr. et al. ............. 356/71

FOREIGN PATENT DOCUMENTS 2805833  8/1979  Fed. Rep. of Germany ........ 40/201
2811656  9/1979  Fed. Rep. of Germany ........ 40/201
2834337  2/1980  Fed. Rep. of Germany ........ 40/201

OTHER PUBLICATIONS

Lohmann et al., Applied Optics, vol. 6, No. 10, Oct. 1967, pp. 1739-1748.
"Identograph K140", Dr. Rudolf Hell GmbH, Kiel, West Germany.
"Identograph K141", R. Oldenburg, Graphische Betriebe, GmbH, Munich, West Germany, 6/79.
Brown et al., Applied Optics, vol. 5, No. 6, Jun. 1966, pp. 967-969.
Huang, Proceedings of the IEEE, vol. 59, No. 9, Sep. 1971, pp. 1335-1346.
"Holographie", Gunther Groh, Verlag Berliner Union, GmbH, Stuttgart, West Germany, pp. 110-117.

Primary Examiner—Vincent P. McGraw
Attorney, Agent, or Firm—Karl F. Milde, Jr.

[57] ABSTRACT

An automobile identification system and a method for producing it are disclosed. The system utilizes a conventional license plate with alpha-numeric characters conveying identifying information perceptible by the unaided eye in combination with a hologram embodying encoded identifying information which cannot be decoded by the unaided eye.

27 Claims, 11 Drawing Figures

AUTOMOBILE IDENTIFICATION SYSTEM

BACKGROUND OF THE INVENTION

1. Field of the Invention

This invention generally relates to the identification of an automobile having a license plate. The invention relates in particular to an automobile identification system, to a method and apparatus for the production of such a system, as well as to a method and apparatus for reading and retrieving coded information in connection with such a system for the purpose of checking this information.

2. Description of the Prior Art

Experience has shown that cars stolen by terrorists and by participants in organized crime are sometimes provided with falsified or forged motor vehicle identifications or license plates and then used for carrying out criminal acts. Either entirely newly made motor vehicle identifications or modified motor vehicle identifications of other automobiles are used. In order to make it difficult for criminals to forge or falsify motor vehicle identifications, the need exists to make the vehicle identifications or plates forgery-proof, i.e. to protect vehicle identifications against forgery (unlawful new manufacture) and falsification (unlawful alteration of authorized identifications). It should be possible at least to easily find out whether or not a motor vehicle identification is false. Such recognition should be possible when the respective vehicle is moving.

In automobile license plates used up to now, alpha-numerical information is embossed or engraved and enhanced by special coloring so as to be clear and recognizable with the unaided eye. Such plates are relatively easy to alter or to manufacture without requiring any high instrumentation cost. In moving traffic such forged or falsified license plates can hardly be detected, if at all.

SUMMARY OF THE INVENTION

1. Objects

It is an object of this invention to provide an automobile identification device or system for attachment or connection to the automobile which cannot be altered or manufactured by an unauthorized person without it being easy to detect the forgery or falsification.

It is another object of this invention to provide an automobile identification device or system whose authenticity can be checked also in moving traffic.

It is another object of this invention to provide a forgery-proof motor vehicle identification device or system which can be checked for its authenticity largely unnoticed by the driver of the motor vehicle and from a distance.

It is still another object of this invention to provide a method and an apparatus for the production of a forgery-proof automobile identification system.

It is still another object of this invention to provide a method and an apparatus for the retrieval of information contained in a coded form in an automobile identification device or system.

2. Summary

According to the invention, an automobile identification device or system includes (1) an automobile license plate, which is provided with information that is clear and recognizable with the unaided human eye, for identifying the respective automobile, and (2) an additional information carrier, either attached to or separate from the license plate, which contains coded information that is not detectable by the unaided human eye.

The basic idea of the invention is to make the technological and instrumental costs for affixing the additional information so high that it becomes practically impossible to imitate or to alter the automobile identification system without the original equipment. Thus forgers, having available only simple tools such as punches and engraving equipment, are no longer able to practice their trade.

In one embodiment, the automobile license plate itself is provided with coded information along with the usual alpha-numeric information recognizable and readable with the unaided eye. This coded information is preferably such that it is possible to call up and read this information quickly, unnoticed, and at a distance with special equipment. In another embodiment the coded information may be provided on a special information carrier near the license plate.

The coded information may, for example, be the fine structure of a suitable hologram. A special hologram in the form of a (one-dimensional) line code may be used. Preferably the hologram may extend over the entire license plate. In particular that combination of alpha-numeric symbols which is visible as clear information on the license plate may be stored in the hologram. Additional information may also be contained therein.

The hologram should preferably be an infrared (IR) hologram because such an IR hologram can be read by means of an infrared laser without danger to the human eye. A suitable reading laser would be a $CO_2$ laser.

An automobile identification device or system of the above-mentioned kind can be produced by the following process: First the surface of a base plate is provided at least partially with a coded, preferably holographic information, and thereafter the mentioned clear information is entered in the base plate in such a way that the base plate forms an automobile license plate.

A somewhat different automobile identification device or system can be produced by this method: On a regular automobile license plate which is provided with the clear information perceivable with the unaided eye for the identification of the respective automobile, a thin foil is applied which contains a coded, preferably holographic information. The foil may consist of a material which easily tears when an attempt is made to detach the foil from the license plate.

The retrieval of the information contained in an automobile identification device or system and the checking of the authenticity of the vehicle identification can be effected as follows if the coded information is a hologram: The information carrier provided with the hologram is illuminated by a reading laser with a laser beam of suitable wave length and beam geometry, e.g. by a $CO_2$ laser. The laser light is partially reflected by the information carrier (e.g. the license plate). On the reflected portion of the laser light the (coded) information contained in the hologram is impressed (spatial modulation). A part of the reflected image wave is received by a sensor and may be transformed by an image converter into an image that can be evaluated visually.

If a form of realization has been chosen where the coded information is the same as the clear information on the vehicle identification, and if the holographically reconstructed information of the image is identical with the clear information, the license plate is regarded as authentic, if not, as forged.

If, on the other hand, a form of realization has been chosen where simply a code number or other code information is stored in the hologram in coded form, then, for checking by a law officer, this code number is transmitted to a central station, e.g. a police precinct, by radio. Thence the checking officer receives the applicable vehicle number and/or additional data which are compiled and stored under this code number or code information.

It should be stressed that the information to be stored holographically can, on being entered in the license plate (base plate, foil), be additionally coded. This can be effected by so-called "optical scrambling". The reconstructed wave field can be evaluated, i.e. legibly represented only after decoding effected in the receiver.

BRIEF DESCRIPTION OF THE DRAWINGS

The foregoing and other objects, features and advantages of the invention will be apparent from the following more particular description of the preferred embodiments of the invention, as illustrated in the accompanying drawings.

In the drawings.

DESCRIPTION OF THE PREFERRED EMBODIMENTS

Figure 1:
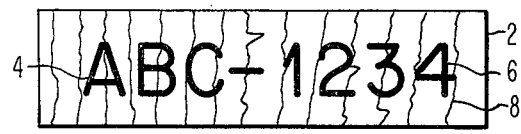
FIG. 1 is a view of an automobile license plate having simultaneously stored a visual and a holographic information.

With reference to FIG. 1, a license plate 2 is shown incorporating an easily perceptible alpha-numeric information, represented by a letter 4 and number 6 combination ABC-1234, and additionally a holographic pattern or information 8, represented by wavy lines. The alpha-numeric information ABC-1234 stands for the registration which usually is assigned to an automobile or vehicle for identification purposes. The holographically stored information 8 is invisible to the human eye and unperceivable without special equipment. It is scattered over the entire plate 2. The holographic pattern 8 may be in particular an infrared hologram.

The information contained in the holographic pattern 8 is coded for the unaided human eye. It may represent the combination ABC-1234 of that alpha-numeric symbol which is visible as clear information on the license plate 2. Alternatively or additionally, the holographic pattern 8 may contain other information, e.g. the name of the rightful car owner, or the color of the car. On the other hand there may simply be stored in the pattern 8 a code number which when checking the car identification is passed on to a central station, e.g. a police precinct. There, data stored e.g. in a computer under this code number are called up and transmitted to the checking officer for comparison. A holographic pattern 8 is a complex structure and is difficult for an unauthorized person to imitate or to alter.

Figure 2:
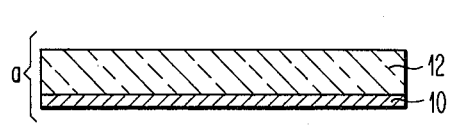
FIGS. 2a, b and c are cross sections of a part of an automobile license plate, illustrating a first process of producing the plate.
Figure 2:
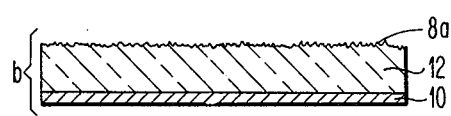
Figure 2:
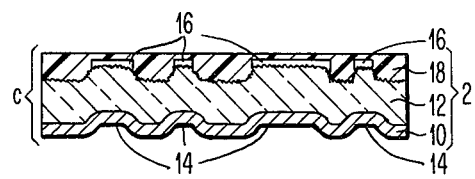
Figure 3:
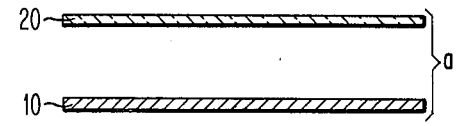
FIGS. 3a, b and c are cross sections of a part of an automobile license plate, illustrating a second process of producing the plate.
Figure 3:
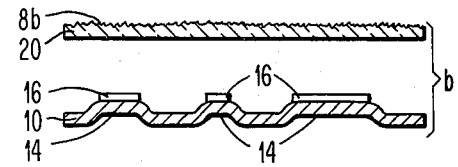
Figure 3:
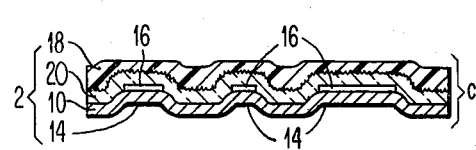
Figure 4:
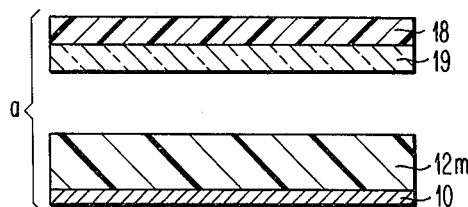
FIGS. 4a, b and c are cross sections of a part of an automobile license plate, illustrating a third process of producing the plate.
Figure 4:
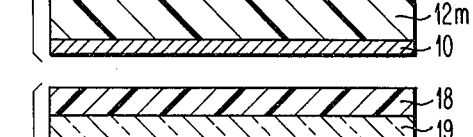
Figure 4:
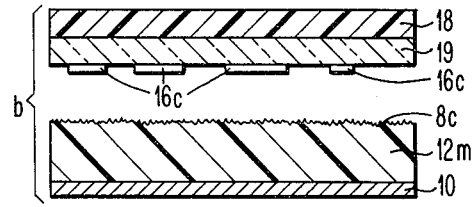
Figure 4:
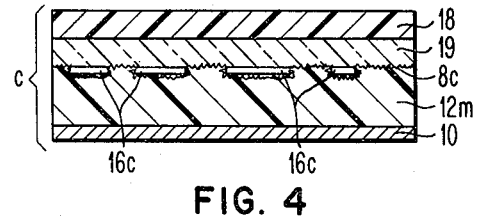

As shown in FIGS. 2, 3 and 4, the license plate 2 may be produced by various methods.

According to FIG. 2a, a base plate 10 of a solid plastic or preferably of metal is coated on its surface with a material 12 transparent to the light of the later used measuring or reading laser. This material 12 may be in particular a synthetic resin or plastic, applied in a thin layer. According to FIG. 2b, a holographic pattern 8a is engraved into the surface of the material 12.

This pattern 8a in turn contains information in coded form. After entry of the holographic pattern 8a, the base plate 10 is embossed or engraved in the usual manner, i.e. the alpha-numeric information ABC-1234 is pressed in. This can be seen in FIG. 2c at the depression points 14. Corresponding to these depressions 14 are elevations on the surface of the material 12, which may be colored with a paint 16 so that the information ABC-1234 will stand out more clearly from the background. When using an IR hologram 8a, the paint 16 may be IR transparent. However, it need not necessarily be IR transparent, as the holographic information can be reconstructed also from the uncolored surface portions of the material 12. The surface of material 12 may also be provided with a protective coating 18, such a transparent foil, to protect the holographic information from mechanical damage and weather factors. The external surface can thus be smooth and even.

According to FIG. 3a, again a base plate 10 of pastic or preferably metal is provided. At the same time a flexible foil 20 is provided. This foil 20 may consist of a plastic. According to FIG. 3b, there is engraved in the metal base plate 10 in the usual manner the registration symbol ABC-1234 of the vehicle and provided with paint 16. The depressions are again designated by 14. The surface of the foil 20 is provided with a holographic pattern 8b. The latter may be engraved. Again the holographic pattern 8b may preferably be an IR hologram. As is evident from FIG. 3c, the foil 20 is then applied on the metal base plate 10. The holographic pattern 8b may be turned either toward or away from the colored surface of the base plate 10. Application of the foil 20 may be effected by gluing. In that case, the foil 20 may preferably be self-adhesive. On being applied, the foil 20 adapts itself to the embossments in the base plate 10. The foil 20 may in particular be of such a material that it tears when trying to detach it. Furthermore, it should be transparent to visible light at least to a large extent, so that the colored clear information ABC-1234 can easily be recognized on the background (base plate 10). Finally, also here an external protective layer 18 may be provided, e.g. again in the form of a transparent foil. Generally, however, such a protective layer 18 will not be necessary.

In FIG. 4 is shown another possibility which may be produced without embossing procedures.

According to FIG. 4a, two different layer blocks are prepared as starting materials. The upper layer block comprises a layer plate 19, which is later provided with the clear information, and an outer protective coating 18 applied thereon. The lower layer block comprises a base plate 10 as a substrate, on which a carrier material 12m for an IR hologram is applied.

According to FIG. 4b, the lower side of the layer plate 19 is provided with alpha-numeric clear data 16c. This can be done by printing, spraying, gluing, engraving, etc. The top side of the carrier material 12m is provided with holographic information 8c.

Then, according to FIG. 4c, the two layer blocks of FIG. 4b are inseparably connected together. The lower side of the upper block is connected to the upper side of the lower block. This can be done by gluing or welding. The important information, namely the clear data 16c and the holographic information 8c, is thus effectively protected in the interior of the motor vehicle identification.

The layers 18 and 19 are made of an IR transparent material, and the carrier material 12m has a high IR reflection coefficient.

Figure 5:
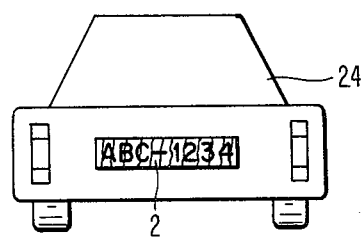
FIGS. 5 and 6 are views of an automobile, indicating the positions where a holographic additional information can be placed.

According to FIG. 5, the license plate 2, containing both a clear information ABC-1234 and a coded holographic information, may be affixed on or attached to a passenger car 24.

Figure 6:
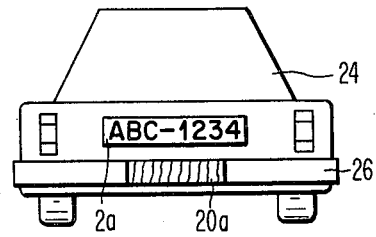

According to FIG. 6, different information carriers are provided for the clear information and the additional holographic information. The clear information ABC-1234 may be contained on an ordinary license plate 2a, while the additional holographic information is stored in a thin foil 20a which is disposed at a different point of the car 24. Production of the foil 20a requires certain equipment. The foil 20a, therefore, can not readily be imitated. It may be applied on the bumper 26, in particular it may be glued on. Similarly as the foil 20 in FIG. 2 it may consist of such a material that it tears on being removed from the bumper 26. This is an assurance against theft of the foil 20a. According to FIG. 6, therefore, the license plate 2a containing the alphanumeric clear information and the holographic sticker or foil 20a, which contains information not readily accessible, are attached or affixed at different places of the car 24.

Figure 7:
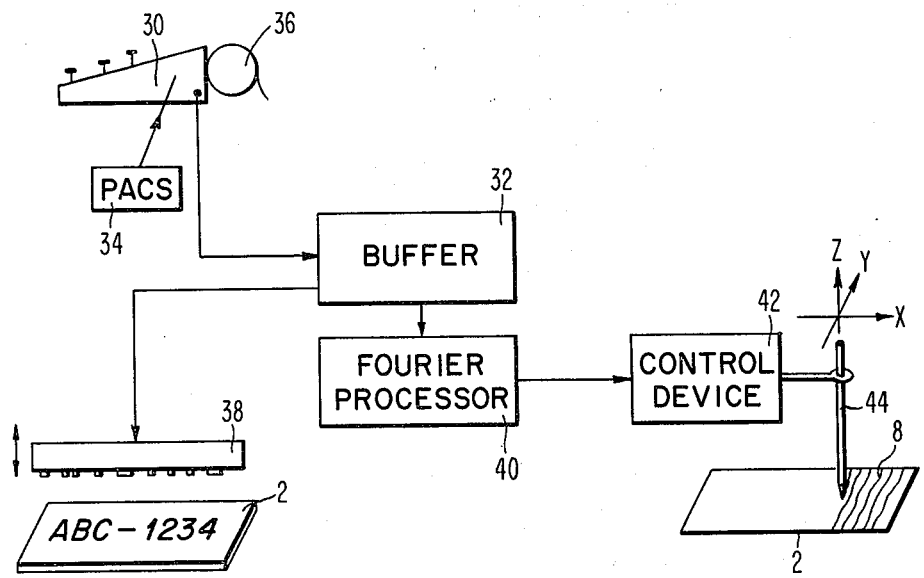
FIG. 7 is a device for making a license plate having stored a registration letter/number combination in alpha-numeric and holographic form.

In FIG. 7 is shown an apparatus for the production of a license plate according to the invention. In this system, the same information ABC-1234, which is visible as clear information on the license plate 2, is also provided on the license plate 2 in holographically coded form.

The combination ABC-1234 of the alpha-numeric symbols is entered via a keyboard of an input device 30 into a buffer storage device 32. To avoid misuse, authorization for access to the plate manufacturing apparatus is checked each time before it is taken into operation. Checking is effected in known manner on the basis of person-specific features such as voice, fingerprint, signature or the like. Accordingly, a Personnal Access Control System (PACS) 34 is connected with the input device 30. The control system 34 ensures that only authorized persons can operate the manufacturing apparatus shown.

From the input device 30, which may further be provided with a paper roll printer 36, the entered information gets to the buffer storage device 32 and thence to an embossing or engraving device 38 and to a Fourier processor 40.

In the Fourier processor 40, the hologram structure is calculated which during subsequent checking of the car license plate reconstructs the alpha-numeric symbols by illumination with a suitable laser beam. The method of calculating a hologram structure by means of a computer, the so-called Fast Fourier Transformation, is well known in holographic technology, and is described in the following references: (1) "Binary Fraunhofer Holograms, Generated by Computer", A. W. Lohmann, D. P. Paris, Applied Optics, Vol. 6, (1967) pp. 1739 ff; (2) "Computer-Generated Binary Holograms", A. W. Lohmann, IBM Journal of Research and Development, Vol. 13 (1969), p. 160; (3) "How To Make Computer Holograms", A. W. Lohmann, Proceeding of the SPIE Seminar, Vol. 25, pp. 43–49, ed. B. J. Thompson and J. B. Develis, paper presented at "Holography 71", Boston, April 1971. An abstract is published in "Holographie" by Gunther Groh, Verlag Berliner Union GmbH, Stuttgart, West Germany, pp. 110–117.

The calculation taken into consideration that the hologram should preferably be as large as the entire license plate. The hologram structure is formed, as mentioned, preferably as a Fourier hologram. Other known hologram structures are also usable. The reasons why preference is given to a Fourier hologram are the following:

(a) Calculation of the hologram can be made relatively easily.

(b) The translation invariance of Fourier holograms can be utilized successfully to make the checking process especially simple. This means that the checking can be done from a moving vehicle (see FIG. 8), because lateral movements of the vehicle to be checked (that is, movements perpendicular to the direction of travel thereof) and of the license plate do not lead in the receiver (cf. FIGS. 10 and 11) upon checking in the direction of travel to lateral movements and migrations of the reconstructed picture. Movements in travel direction of the vehicle to be checked are no problem in view of the great depth of focus. Besides, no especially great resolution is required in that reconstruction.

In the calculation of the Fourier hologram there preferably be used algorithms which in the readout of the hologram lead to a picture with a signal-to-noise ratio which is as high as possible. Such algorithms have been published in literature by H. Lohmann et al, e.g. in the three above-mentioned articles; and in (1) "Complex Spatial Filtering With Binary Masks", B. R. Brown and A. W. Lohmann, Applied Optics, Vol. 5, No. 6, June 1966, pp. 967–969; and (2) "Digital Holography", Thomas S. Huang, Proceedings IEEE, Vol. 59, No. 9, September 1971, pp. 1335–1345.

After the Fourier hologram has been calculated, this information is entered into a control device 42 which is intended for controlling an engraving device 44 having a stylus. The control device 42 controls the movement of the engraving stylus in the directions of coordinates x, y, z which are perpendicular to each other. The stylus engraves the Fourier hologram structure into the surface of the license plates, see also FIG. 2b and FIG. 3b, said surface being that of an applied material coating 12 or of a foil 20, respectively.

The production or engraving of the hologram may alternatively be effected by means of a focused laser beam.

The control device 42 and the engraving device 44 with stylus are known per se in the hologram technology, e.g. they are used in the prior art for the production of identification cards having a hologram structure. Such devices 42 and 44 can be employed also in the present instance, even if the hologram is an IR hologram. An engraving device for the production of identification cards is, for instance, commercially available as "Identograph K 140" by Dr. Rudolf Hell GmbH, Kiel, West Germany, or as "Identograph K 141" by R. Oldenburg, Graphische Betriebe GmbH, Munich, West Germany.

After the engraving of the hologram, the clear information ABC-1234 is embossed or impressed into the license plate 2 in the usual manner, see the depressions 14 in FIGS. 2c and 3c. The embossing device 38 serves to emboss the visually perceptible alpha-numeric clear information.

It shall be emphasized once more that the raised portions of the license plate 2 after the embossing in the embossing device can be colored with paint 16 (by a coloring device not shown in FIG. 7). The license plate can then also be provided with a protective coating 18. The paint 16 and the protective coating 18 should preferably be transparent for the infrared light.

Figure 8:
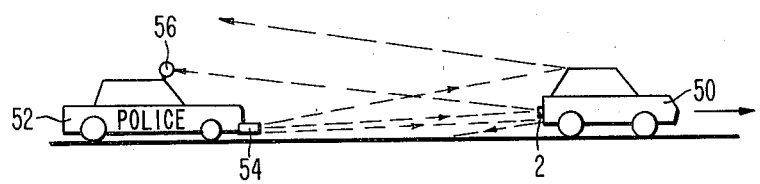
FIG. 8 is a side view of a checking arrangement checking the license plate of an automobile.

In FIG. 8 as illustrated the checking of the license plate 2 of an automobile 52. A police vehicle 52 is equipped with a reading or measuring laser 54, preferably an IR laser, and with a receiver 56. The measuring laser 54 may be in particular a $CO_2$ laser. The advantages of an IR laser are the following:

(a) The laser beam is invisible and innocuous to the human eye. Passers-by are thus protected from dangerous light radiation.

(b) Checking of the automobile 50 can be effected unnoticed by the driver, another passenger or a passer-by.

(c) Checking at relatively large distance is possible.

(d) The automobile can be checked also while traveling.

$CO_2$ lasers emitting with a high radiation intensity in infrared (wavelength 10.06 microns) are readily available commercially. They are highly efficient and can be built to be very small and compact.

Departing from FIG. 8, the checking officer can also pick-up the license plate 2 with the cross hairs of a field glass. The measuring laser 54 which may be connected with the field glass is then automatically trained on the target, namely the license plate of the vehicle 50.

Figure 9:
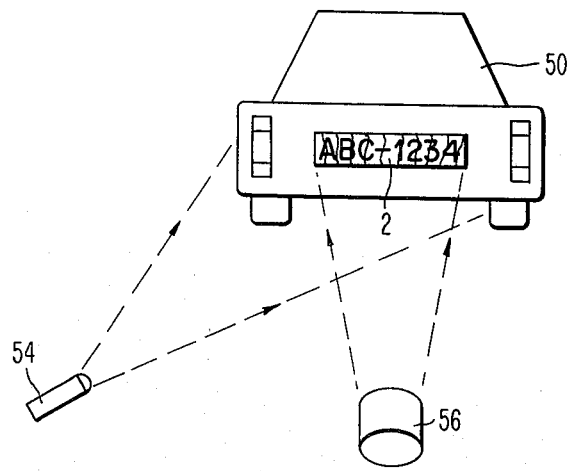
FIG. 9 is a perspective view of a checking arrangement according to FIG. 8.

In FIG. 9, the checking is illustrated once more perspectively. The laser 54 and the receiver 56 are here arranged side by side. They may just as well be arranged one above the other.

Figure 10:
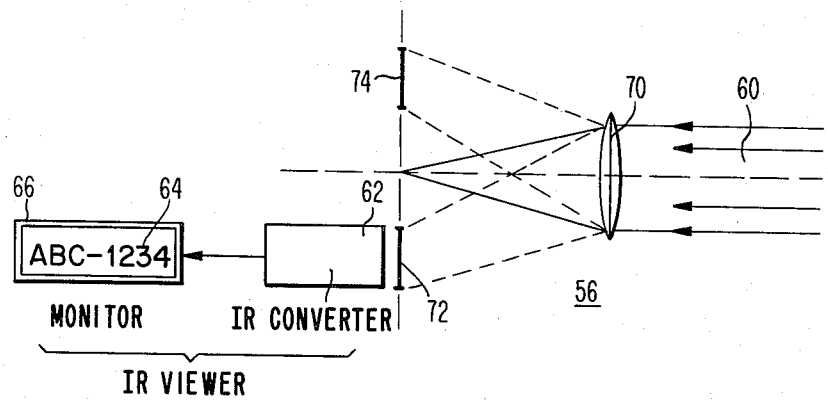
FIG. 10 is a more detailed sketch of a first checking device according to FIG. 8.
Figure 11:
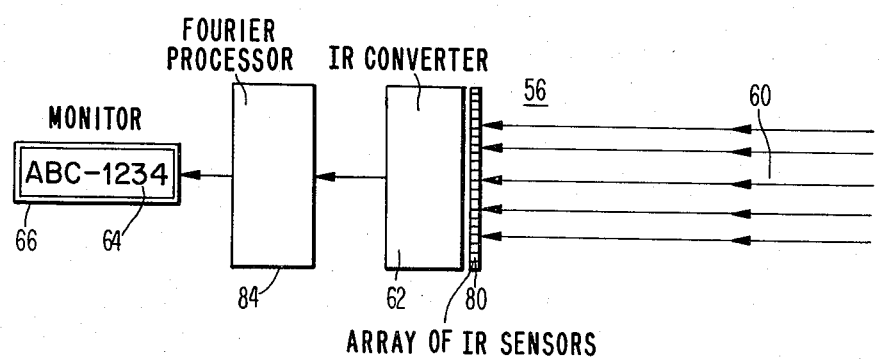
FIG. 11 is a more detailed sketch of a second checking device according to FIG. 8.

In FIGS. 10 and 11, two different receiving devices 56 are illustrated, which can be used in the checking of a vehicle 50 (FIGS. 8 and 9). The receiving devices 56 are apparatus for retrieval of coded informations. Both are based on the following principle: The measuring laser 54 irradiates the license plate 2, the reflected image wave 60 is received by an IR image converter 62 and transformed into an image information 64 which is visually perceptible by an observer on a monitor 66.

For the retrieval of the holographically coded information, it is necessary to carry out a reverse Fourier transformation. This can be done either with a Fourier optical system (see FIG. 10) or with segmented sensor matrices and an after-connected Fourier processor (see FIG. 11).

According to FIG. 10, the reflected IR image wave 60 impinges in the receiver 56 on an IR lens 70. Such an IR lens 70 is a well known, commercially available product. The Fourier lens system projects, as is known in the holography technology, two images, namely a direct image 72 and a conjugated image 74. One of them, here the direct image 72, is used for the reconstruction of the coded information. It is received by the IR image converter 62 and is there transformed electronically into the image information ABC-1234 visible on the monitor a 66. IR image converters 62 with monitor 66 are commercially available, as for instance "IR Viewers".

According to FIG. 11, the reflected image wave 60 impinges on an IR sensor matrix 80. This IR sensor matrix 80 in turn is followed by an IR image converter 62 with a Fourier processor 84. IR detectors in matrix arrangement are available commercially, e.g. at the Santa Barbara Research Center, Goleta, Calif. 93017.

The receiving and image converting device 56 may in particular be portable.

While the forms of the automobile identification system herein described constitute preferred embodiments of the invention, it is to be understood that the invention is not limited to these precise forms of assembly, and that a variety of changes may be made therein without departing from the scope of the invention. The same is true also for the method for producing such a system and for the apparatus and method for the retrieval of a stored information as described herein.

It is claimed that:

1. In an identification system for an automobile, said system having an automobile license plate provided with clear information which is readable by the unaided human eye for identification of said automobile, the improvement comprising an additional information carrier which contains a coded information not decodable with the unaided human eye and which can be affixed on said automobile.

2. The automobile identification system according to claim 1, wherein said additional information carrier is applied near said license plate.

3. The automobile identification system according to claim 1, wherein said additional information carrier forms a structural unit with said license plate.

4. The automobile identification system according to claim 1, wherein said coded information of said additional information carrier is identical with said clear information of said license plate.

5. The automobile identification system according to claim 1, wherein said coded information contains besides the information content of said clear information a supplementary information.

6. The automobile identification system according to claim 3, wherein said coded information is distributed over at least the greater part of said license plate.

7. The automobile identification system according to claim 3, wherein a base plate is provided having a surface, said coded information being engraved into said surface and said clear information being stamped into said base plate in alpha-numeric form.

8. The automobile identification system according to claim 3, wherein a base plate is provided having a surface, wherein said clear information is stamped in alpha-numeric form into said base plate, and wherein a thin foil is applied on the surface of said base plate, said foil containing said coded information.

9. The automobile identification system according to claim 2, wherein said additional information carrier is applied on the bumper of said automobile.

10. The automobile identification system according to claim 1, wherein said additional information carrier is provided with a protective coating.

11. A method for producing an automobile identification system comprising the steps of first providing the surface of a base plate at least partially with a coded information, and thereafter providing said base plate with a clear information recognizable by the unaided human eye for identifying said automobile, in such a way that said base plate is an information carrier for said coded information and at the same time is an automobile license plate.

12. A method for producing an automobile identification system comprising the steps of first producing an automobile license plate containing a clear information recognizable by the unaided human eye for identification of the respective automobile, and thereafter applying a thin foil on said license plate, said foil containing a coded information which is not decodable by the unaided human eye.

13. The method according to claim 11, wherein providing said surface with said coded information comprises the steps of entering the information to be encoded into a computer, calculating therefrom a hologram according to a given program, and engraving said hologram thereafter into the surface of said base plate.

14. The method according to claim 12, wherein the step of providing said surface with said coded information comprises the steps of entering the information to be encoded into a computer, calculating therefrom a hologram according to a given program, and engraving said hologram into the surface of said foil.

15. The method according to claim 13 or 14, comprising the step of additionally coding said holographic information on being entered into said surface.

16. An apparatus for producing an automobile identification system comprising, in combination, an engraving tool engraving of a hologram into a surface, a control device for controlling said engraving tool, a Fourier processor for calculating said hologram, said processor being connected to said control device, and an input device for entering an information to be encoded into said processor.

17. A method for the retrieval of a coded information in an automobile identification system, said coded information being stored in an additional information carrier in the form of a hologram, comprising the steps of irradiation said hologram of said additional information carrier with measuring laser light, picking up the reflected light by a sensor, and transforming said light by an image converter into an image that can be evaluated visually.

18. An apparatus for the retrieval of a coded information in an automobile identification system, said coded information being stored in an additional information carrier in the form of a hologram, comprising in combination:

(a) a measuring laser for the irradiation of said hologram with measuring laser light;

(b) an optical system for receiving the reflected measuring laser light;
(c) a system for inverse Fourier transformation; and
(d) a monitor for the visual representation of an image.

19. The apparatus according to claim 18 for an infrared hologram, wherein said measuring laser is an IR laser and said optical system in an IR lens.

20. The apparatus according to claim 18 for an infrared hologram, wherein said optical system includes an image converter, and wherein said system for inverse Fourier transformation includes a Fourier processor.

21. The apparatus according to claim 18, wherein a field glass is coupled with said measuring laser.

22. The apparatus according to claim 19, wherein said measuring laser is a $CO_2$ laser.

23. In an identification system for an automobile, said system having an automobile license plate provided with clear information which is readable by the unaided human eye for identification of said automobile, the improvement comprising an additional information carrier which contains a coded information in the form of a hologram which is not decodable with the unaided human eye and which can be affixed on said automobile; said means mounting said additional information carrier onto said automobile.

24. The automobile identification system according to claim 23, wherein said hologram is an infrared hologram.

25. A method for producing an automobile identification system comprising the steps of first providing the surface of a base plate at least partially with a coded information in the form of a hologram, and thereafter providing said base plate with a clear information recognizable by the unaided human eye for identifying said automobile, in such a way that said base plate is an information carrier for said coded information and at the same time is an automobile license plate.

26. A method for producing an automobile identification system comprising the steps of first producing an automobile license plate containing a clear information recognizable by the unaided human eye for identification of the respective automobile, and thereafter applying a thin foil on said license plate, said foil containing a coded information in the form of a hologram which is not decodable by the unaided human eye.

27. An identification system for an automobile including an automobile license plate, comprising:
a base plate having indicia thereon to present identifying information for perception by an unaided human eye; and
a layer of transparent material located on the base plate and embodying coded identifying information in the form of a hologram not decodable by the unaided human eye.

* * * * *